(12) United States Patent
Hsu et al.

(10) Patent No.: US 10,727,689 B2
(45) Date of Patent: Jul. 28, 2020

(54) POWER OUTLET DEVICE AND CONTROLLING METHOD THEREOF

(71) Applicant: CYBER POWER SYSTEMS, INC., Taipei (TW)

(72) Inventors: Chih-Hao Hsu, Taipei (TW); Yen-Nan Liu, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 215 days.

(21) Appl. No.: 15/873,356

(22) Filed: Jan. 17, 2018

(65) Prior Publication Data
US 2019/0067983 A1 Feb. 28, 2019

(30) Foreign Application Priority Data
Aug. 25, 2017 (TW) .............................. 106128913 A

(51) Int. Cl.
| | |
|---|---|
| *H02J 9/00* | (2006.01) |
| *H01R 13/66* | (2006.01) |
| *H02J 13/00* | (2006.01) |
| *G06F 1/26* | (2006.01) |
| *H01R 13/70* | (2006.01) |
| *H01R 25/00* | (2006.01) |

(52) U.S. Cl.
CPC ............. *H02J 9/005* (2013.01); *G06F 1/266* (2013.01); *H01R 13/6683* (2013.01); *H02J 13/0006* (2013.01); *G06F 2200/261* (2013.01); *H01R 13/665* (2013.01); *H01R 13/70* (2013.01); *H01R 25/006* (2013.01)

(58) Field of Classification Search
CPC ................................. H01R 13/6683; H01R 13/665; H01R 25/006; H01R 13/70; G06F 1/266; G06F 2200/261; H02J 9/005; H02J 13/0006
See application file for complete search history.

(56) References Cited

U.S. PATENT DOCUMENTS

| | | | |
|---|---|---|---|
| 2009/0307505 A1* | 12/2009 | Robertson | ............... G06F 1/266 713/300 |
| 2010/0038218 A1* | 2/2010 | Fisher | .................. H01R 13/665 200/51.02 |

(Continued)

FOREIGN PATENT DOCUMENTS

| | | |
|---|---|---|
| CN | 102854829 A | 1/2013 |
| CN | 203967410 U | 11/2014 |
| TW | 201227191 A1 | 7/2012 |

*Primary Examiner* — Alfonso Perez Borroto
*Assistant Examiner* — Esayas G Yeshaw
(74) *Attorney, Agent, or Firm* — Bacon & Thomas, PLLC

(57) ABSTRACT

A power outlet device including a first socket assembly coupled to an external power, a first switch, a detecting circuit coupled to first socket assembly through the first switch, and a controller is provided. The first switch is coupled to the first socket assembly for turning, on or off the power supply of the first socket assembly. The detecting circuit detects at least one power value of the first socket assembly. The controller is coupled to the first switch and the detecting circuit respectively, and averages the plurality of power values within a predetermined time for generating an average power value. The controller turns on or off the first switch according to the average power value and a current power value. A controlling method of the power outlet device is further provided.

18 Claims, 2 Drawing Sheets

(56) References Cited

U.S. PATENT DOCUMENTS

2011/0169342 A1* 7/2011 Tinaphong ......... H01R 13/6683
  307/126
2011/0270458 A1* 11/2011 Liu ..................... H01R 13/713
  700/293
2017/0125984 A1* 5/2017 Mergener ................. H02B 1/52

* cited by examiner

POWER OUTLET DEVICE AND CONTROLLING METHOD THEREOF

BACKGROUND OF THE INVENTION

Field of the Invention

The present invention relates to a power outlet device and a controlling method thereof, and more particularly, the present invention relates to a power outlet device and a controlling method thereof with efficiency of energy saving.

Description of Related Art

With the popularity of electrical products and the development of wireless remote control technology, users are accustomed to the use of remote controller to carry out the operation of electrical products, such as turning-on operation or turning-off operation for electrical products. However, even if the electrical product has been turned off, but the plugs of electrical products are still plugged in power outlet. In other words, the electrical products are still in standby mode, which causes energy consuming and does not meet the requirements of energy saving.

In addition, one socket assembly may also be plugged with a number of electrical products. These electrical products can be constituted as an audio and video module. Wherein, when the player of the audio and video module is turned off and be in the standby state, the working power of other peripheral equipment may still be in open state, which causes energy consuming and does not meet the requirements of energy saving. The peripheral equipment is, for example, screen or speaker.

SUMMARY OF THE INVENTION

Accordingly, an object of the present invention is to provide a power outlet device and a controlling method thereof for taking into account the requirement of energy saving when uses electrical products.

To achieve the foregoing and other objects, a power outlet device including a first socket assembly, a first switch, a detecting circuit and a controller is provided. The first socket assembly is coupled to an external power and has at least one first socket. At least one load is coupled to the first socket assembly. The first switch is coupled to the first socket assembly for turning on or off power supply of the external power to the first socket assembly. The detecting circuit, is coupled to the first socket assembly through the first switch. When the first switch is turned opt, the detecting circuit detects at least one power value of the first socket assembly. The controller is coupled to the first switch and the detecting circuit respectively. The controller averages the power values within a predetermined time for generating an average power value. Wherein, the controller turns on or turns off the first switch according to the average power value and a current power value.

In one embodiment of the present invention, when the current power value is greater than a predetermined proportion of the average power value, the controller turns on the first switch continuously, when the current power value is not greater than the predetermined proportion of the average power value, the controller turns off the first switch.

In one embodiment of the present invention, the power outlet device further comprises a sensor, a first signal and a second signal are received by the sensor for transmitting to the controller, wherein when the sensor receives the first signal, the controller turns on the first switch, when the sensor receives the second signal, the controller turns on the first switch continuously.

In one embodiment of the present invention, at least one of the first signal and the second, signal is sent by a corresponding remote controller of the load or an external load without coupling to the first socket assembly.

In one embodiment of the present invention, the power outlet device further comprises a resetting unit and a reminding unit, the resetting unit sends a resetting signal to the controller, the controller turns on the first switch continuously when receives the resetting signal, and makes the detecting circuit detect the power value of the first socket assembly for averaging the power values within the predetermined time to get the average power value again, and the reminding unit receives a reminding signal, sent by the controller for generating a reminding message when the current power value is smaller than a reducing proportion of the average power value, the reducing proportion is 20%~50%.

In one embodiment of the present invention, when the reminding message is generated by the reminding unit and the current power value is not greater than the predetermined proportion of the average power value, the controller turns off the first switch, when the reminding message is generated by the reminding unit and the current power value is greater than the predetermined proportion of the average power value, the resetting unit sends the resetting signal to the controller, when the controller receives the resetting signal, the controller turns on the first switch continuously and averages the power values within the predetermined time for obtaining the average power value again.

In one embodiment of the present invention, the sensor, the resetting unit and the reminding unit are coupled to the controller in wired or wireless way.

In one embodiment of the present invention, the power outlet device further includes a second socket assembly, the second socket assembly has at least one second socket, wherein the detecting circuit is coupled between the second socket assembly and the first switch.

In one embodiment of the present invention, the power outlet device further includes a second switch coupled to the external power, wherein the second socket assembly and the detecting circuit are coupled to the second switch, and the controller and the detecting circuit are coupled to the second switch, a third signal is suitable for transmitting to the controller when the second switch is turned on, and the controller turns on the first switch according to the third signal.

In one embodiment of the present invention, the predetermined proportion is 50%~80%, the current power value is the latest power value detected by the detecting circuit, and the power values within the predetermined time are changed, with the continuous detection of the detecting circuit.

A controlling method of the power outlet device is provided, which including the following steps:

providing a power outlet device, the power outlet device includes a first socket assembly, a first switch, a detecting circuit and a controller. Wherein, the first socket assembly is coupled to an external power and has at least one first socket. At least one load is coupled to the first socket assembly. The first switch is coupled to the first socket assembly for turning on or off power supply of the external power to the first socket assembly. The detecting circuit is coupled to the first socket assembly through the first switch. The controller is coupled to the first switch and the detecting circuit respectively;

the detecting circuit detects at least one power value of the first socket assembly when the first switch is turned on; and the controller averages the power values within a predetermined time for generating an average power value; and the controller turns on or turns off the first switch according to the average power value and a current power value.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
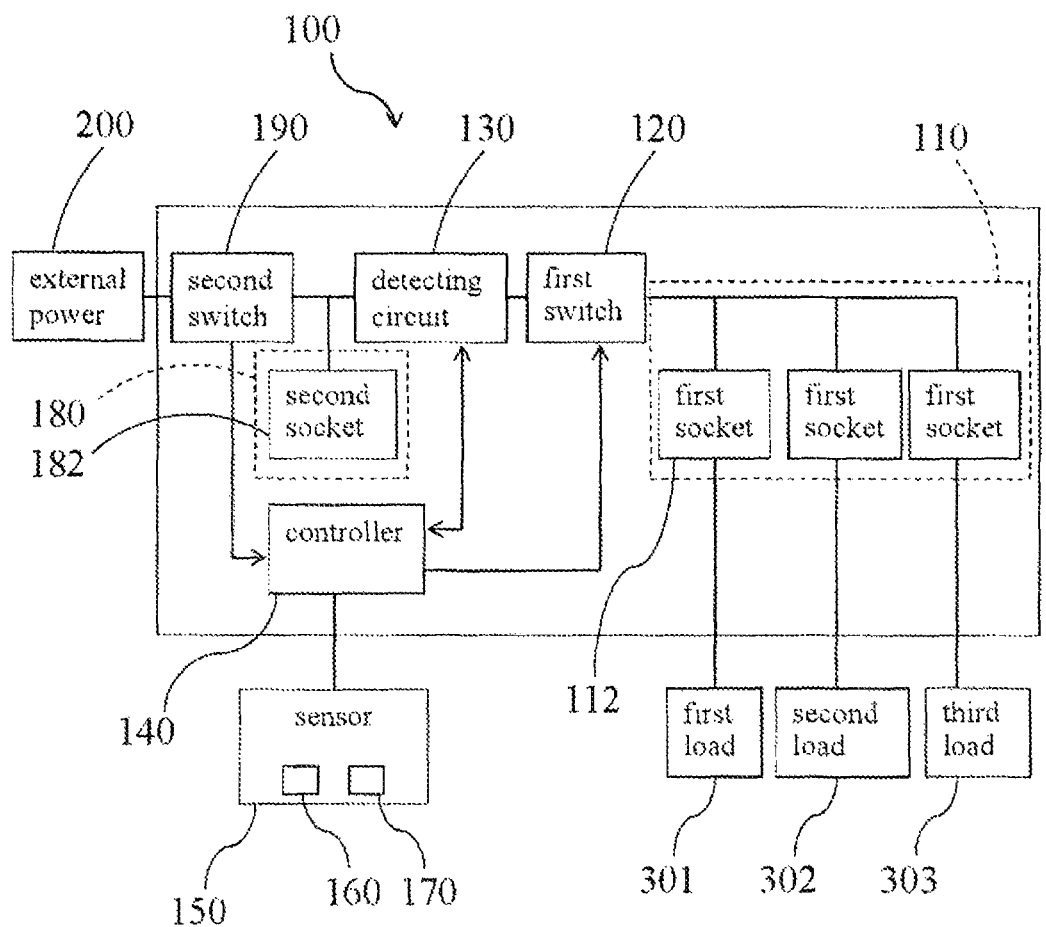
FIG. 1 is a schematic view illustrating a power outlet device according to one embodiment of the present invention.

FIG. 1 is a schematic view illustrating a power outlet device according to one embodiment of the present invention. Referring to FIG. 1, a power outlet device 100 of the present embodiment includes a first socket assembly 110, a first switch 120, a detecting circuit 130 and a controller 140 mainly. In addition, a power outlet device 100 of the present embodiment further includes a sensor 150. In the present embodiment, the first socket assembly 110 is coupled to an external power 200. At least one load is coupled to the first socket assembly 110. The external power 200 is, for example, a utility power. The first socket assembly 110 of the present embodiment has at least one first socket 112. The load is, for example, coupled to the first socket 112. Wherein, the first socket assembly 110 of the present embodiment is exemplified by applying three first sockets 112 in FIG. 1, and the present invention will not be limited to this. Correspondingly, there are also three loading devices illustrated in FIG. 1. The three loading devices are, a first load 301, a second load 302 and a third load 303 respectively.

From above, the first switch 120 of the present embodiment is coupled to the first socket assembly 110. Wherein, the first switch 120 can be turned on or turned off the power supply of the external power 200 to the first socket assembly 110. In addition, the detecting circuit 130 is coupled to the first socket assembly 110 through the first switch 120. Wherein, the detecting circuit 130 can detect at least one power value of the first socket assembly 110 when the first switch 120 is turned on.

Worth mention, the power value is the power value of the first socket assembly 110 detected by the detecting circuit 130 when the first switch 120 is turned on and at least one of the first load 301, the second load 302 and the third load 303 is coupled to the first socket assembly 110. In other words, the power value is, for example, the sum of power values produced by the first load 301, the second load 302 and the third load 303. In addition, when the power value is detected by the detecting circuit 130, it is not limited in whether the first load 301, the second load 302 or the third load 303 is in normal operation. This means, the first load 301, the second load 302 or the third load 303 can be in working state (in normal operation) or standby state when the power value is detected by the detecting circuit 130.

In the present embodiment, the controller 140 of the present embodiment is coupled to the first switch 120 and the detecting circuit 130 respectively. Thus, the controller 140 also can receive or read the power values except controlling the on/off state of the first switch 120. Especially, the controller 140 of the present embodiment can average the power values within a predetermined time for generating an average power value when receives or reads the power values. Thus, the controller 140 of the present embodiment can turn on or off the first switch 120 according to the average power value and a current power value for changing the power supply state of the first socket assembly 110. Wherein, the current power value is, for example, the latest power value detected by the detecting circuit 130 in the present situation.

In detail, when the first switch 120 is turned on, the detecting circuit 130 can detects the power value of the first socket assembly 110 continuously. Thus, with the continuous detection of the detecting circuit 130, the power value of the first socket assembly 110 will be detected at every moment continuously. Therefore, the controller 140 can average multiple power values detected within the predetermined time by the detecting circuit 130 for obtaining the average power value. Further, the controller 140 can compare the average power value and the current power value. In the present embodiment, the power values within the predetermined time are changed with the continuous detection of the detecting circuit. Thus, the average power value also can change with the continuous detection of the detecting circuit. In addition, the detecting circuit of the present embodiment also can detect the power value produced by the first socket assembly 110 in a cyclical detecting way, and the present invention will not be limited to this.

From above, in the present embodiment, when the current power value (the latest power value) is greater than a predetermined proportion of the average power value, the controller 140 can turn on the first switch 120 continuously. In other words, the first socket assembly 110 can be power supplied by the external power 200. Relatively, when the current power value (the latest power value) is not greater than the predetermined proportion of the average power value, the controller 140 can turn off the first switch 120. In other words, the first socket assembly 110 is disconnected from the external power 200. Wherein, the predetermined proportion is, for example, 50%~80%. Certainly, in the present embodiment, an acceptable tolerance is allowed in the comparison of the average power value and the current power value (the latest power value), and the present invention will not be limited to this.

For example, in the present embodiment, the first load 301 can be a screen, the second load 302 can be a player, and the third load 303 can be a speaker. The first load 301, the second load 302 and the third load 303 are, for example, constituted as an audio and video module. Wherein, the second load 302 is, for example, a main device of the audio and video module. The first load 301 and the third load 303 are, for example, auxiliary devices of the audio and video module. The power of the second load 302 in use (the second load 302 is in normal operation) is, for example, greater than the power of the first load 301 or the third load 303 in use (the first load 301 or the third load 303 is in normal operation). Thus, when the audio and video module is in use (the first load 301, the second load 302 and the third load 303 are all in normal operation), the power value of the first socket assembly 110 (current power value) detected by the detecting circuit 130 is greater than the predetermined proportion of the average power value which being produced previously. Further, the controller 140 can turn on the first switch 120 continuously for power supplying to the first socket assembly 110 by the external power 200 after the comparison of the predetermined proportion of the average power value and the current power value (the latest power value). Therefore, the audio and video module can work normally.

Relatively, when the audio and video module is no need to use and the second load 302 is turned off to be in standby state from working state, the power value of the first socket assembly 110 (current power value) detected by the detecting circuit 130 is, for example, not greater than the predetermined proportion of the average power value which being produced previously. Further, the controller 140 can turn off the first switch 120 for stopping the power supply of the external power 200 to the first socket assembly 110 after comparing the predetermined proportion of the average power value and the current power value (the latest power value). Therefore, the power supply of main device such as the second load 302 can be removed. The power supply of other devices such as the first load 301 and the third load 303 also can be removed simultaneously for achieving the efficiency of energy saving.

Although the mentioned load which being turned off is exemplified as the second load 302 like the main device of the audio and video module, but the present invention will not be limited to this. In other preferred embodiments, when the power value of the first socket assembly 110 (current power value) detected by detecting circuit 130 is not greater than the predetermined proportion of the average power value which being produced previously, the controller 140 also turn off the first switch 120 after auxiliary loads or electrical products without definitions of main loads or auxiliary loads turns off the power to be in standby state from working state. In other words, the power supply of the external power 200 is stopped for the first socket assembly 110. This prevents energy loss, and the efficiency of energy saving can be achieved in the present invention.

Besides, a first signal is received by the sensor 150 of the present embodiment for transmitting to the controller 140. In the present embodiment, when the sensor 150 receives the first signal, the controller 140 can turn on the first switch 120. Therefore, the detecting circuit 130 can detects the power value of the first socket assembly 110 through the first switch 120. Wherein, the first signal is, for example, an infrared signal or other appropriate wireless signal sent by the corresponding remote controller of the first load 301, the second load 302 or the third load 303 coupled to the first socket assembly. Certainly, the first signal also can be sent by a corresponding remote controller of an external load (not shown) without coupling to the first socket assembly, and the present invention will not be limited to this.

For example, when the sensor 150 receives the first signal like as the infrared signal, the controller 140 can turn on the first switch 120. Further, the detecting circuit 130 can detect the power value of the first socket assembly 110. Further, when the detecting circuit 130 detects the power value continuously, the controller 140 can obtains the average power value through the averaging operation mentioned in above for comparing with the current power value, and then the working state of the first socket assembly 110 can be determined.

Figure 2:
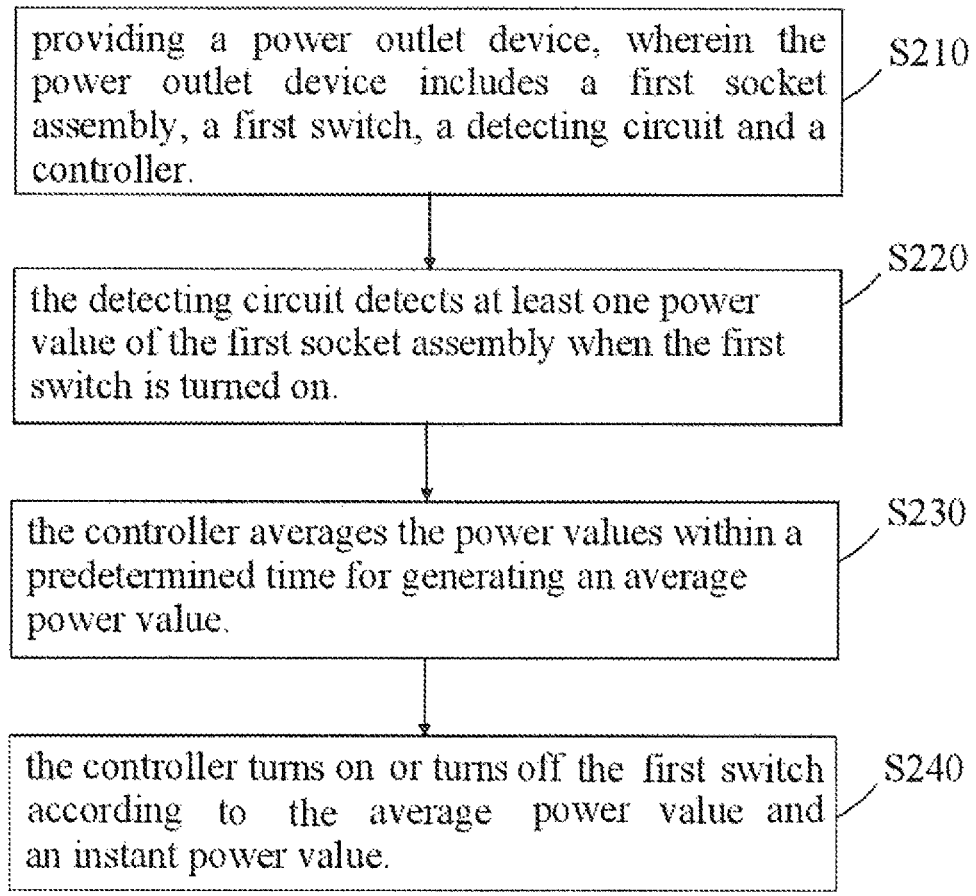
FIG. 2 is a flow chart illustrating a controlling method of power outlet device according to one embodiment of the present invention.

FIG. 2 is a flow chart illustrating a controlling method, of power outlet device according to one embodiment of the present invention. Please refer to FIG. 2, in the present embodiment, the controlling method of the power outlet device includes the following steps: firstly, in step S210, providing a power outlet device, wherein the power outlet device includes a first socket assembly, a first switch, a detecting circuit and a controller. The first socket assembly of the present embodiment is coupled to an external power and has at least one first socket. Similar to the foregoing embodiment, in the present embodiment, at least one load is coupled to the first socket assembly. In addition, the first switch is coupled to the first socket assembly for turning on or turning off the power supply of the external power to the first socket assembly. Besides, the detecting circuit is coupled to the first socket assembly through the first switch. The controller is coupled to the first switch and the detecting circuit respectively.

After step S210, step S220 is executed, the detecting circuit detects at least one power value of the first socket assembly when the first switch is turned on. As described above, the power value of the present embodiment is, for example, the sum of power values produced by the first load 301, the second load 302 and the third load 303. In addition, when the power value is detected by the detecting circuit 130, it is not limited in whether the first load 301, the second load 302 or the third load 303 is in normal operation. Next, in step S230, the controller averages the power values within a predetermined time for generating average power value. Wherein, the power values within the predetermined time are changed with the continuous detection of the detecting circuit. Thus, the average power value also can change with the continuous detection of the detecting circuit.

Thereafter, in step S240, the controller turns on or turns off the first switch according to the average power value and a current power value. In detail, the controller will make the comparison of the average power value and the current power value for determining the working state of the first socket assembly. As described above, when the current power value is greater than a predetermined proportion of the average power value, the controller will determine that the main load coupled to the first socket assembly is, for example, still in working state (the main load is in normal operation). Therefore, the controller can make the first switch keep in ON state for continuously keeping the external power to the first socket assembly. Relatively, when the current power value is not greater than the predetermined proportion, of the average power value, the controller will determine that the main load coupled to the first socket assembly is, for example, already in standby state. Therefore, the controller can turn off the first switch. In, other words, the power supply of the external power is stopped for the first socket assembly. This prevents energy loss, and the efficiency of energy saving can be achieved in the present invention.

Certainly, as described above, in other preferred, embodiments, when the power value of the first socket assembly (current power value) detected by detecting circuit is not greater than the predetermined proportion of the average power value which being produced previously, the controller also turn off the first switch after auxiliary loads or electrical products without definitions of main loads or auxiliary loads turns off the power to be in standby state from working state. In other words, the power supply of the external power is stopped for the first socket assembly. This prevents energy loss, and the efficiency of energy saving can be achieved in the present invention. The present invention will not be limited or define to the main load and the auxiliary load.

From above, a power outlet device 100 of the present embodiment also can include a second socket assembly 180 and a second switch 190. The second socket assembly 180 has at least one second socket 182. Wherein, the second socket assembly 180 of the present embodiment is exemplified by applying one second socket 182 in FIG. 1, and, the present invention will not be limited to this. The detecting circuit 130 is coupled between the second socket assembly 180 and the first switch 120. The second, socket assembly 180 and the detecting circuit 130 are coupled to the second switch 190. In other words, the detecting circuit 130 is coupled between the first switch 120 and the second switch 190. In addition, the controller 140 and the detecting circuit 130 are coupled to the second switch 190. Wherein, the second switch 190 of the present embodiment is, for example, coupled to the external power 200 directly. Thus, when second switch 190 is turned on, the elements coupled between the second switch 190 and the first switch 120 can be power supplied by the external power 200 firstly. In other words, when an external load is coupled to the second socket 182 and the second switch 190 is turned on, the external load can be power supplied by the external power 200. Similarly, when the second switch 190 is turned on, the detecting circuit 130, the controller 140 and the sensor 150 also can perform the corresponding work.

Especially, in one preferred embodiment, the conduction of the second switch 190 also can triggers the conduction of the first switch 120 so that the detecting circuit 130 can detect the power value of the first socket assembly 110. In detail, when the second switch 190 is turned on, a third signal is sent to the controller 140, and the controller 140 can turn on the first switch 120 according to the third signal. In other words, the conduction of the second switch 190 can triggers the conduction of the first switch 120 synchronously. Further, the detecting circuit 130 can detect the power value of the first socket assembly 110 quickly.

On the other hand, the power outlet device 100 of the present embodiment further includes a resetting unit 160 and a reminding unit 170. Wherein, the sensor 150, the resetting unit 160 and the reminding unit 170 are, for example, integrated in a body, and connected with the controller 140 in wired or wireless way. In addition, the sensor 150, the resetting unit 160 and the reminding unit 170 also can integrated in the same body with the controller 140, and the present invention will not be limited to this.

In the present embodiment, the resetting unit 160 is, for example, a button which is suitable for sending a resetting signal to the controller 140. When the controller 140 receives the resetting signal, the controller 140 can turn on the first switch 120 continuously, and make the detecting circuit 130 detect the power value of the first socket assembly 110. Further, the controller 140 will, average multiple power values detected within the predetermined time by the detecting circuit 130 for obtaining another average power value again. In other words, the power outlet device 100 of the present embodiment can reacquire the average power value of the first socket assembly 110.

In addition, the reminding unit 170 of the present embodiment is, for example, a light emitting element or other appropriate elements. In the present embodiment, when the current power value is smaller than a reducing proportion of the average power value, the reminding unit 170 can receive a reminding signal sent by the controller 140 for generating a reminding message. The reducing proportion is, for example, between 20%~50%. In detail, when the current power value of the first socket assembly 110 is smaller than the reducing proportion of the average power value, the power outlet device 100 of the present embodiment can send the reminding message through the reminding unit 170. The reminding message is represented that the first switch 120 will turn off soon and the power supply of the first socket assembly 110 will be stopped. Certainly, when the reminding message is generated by the reminding unit 170, a second signal can be received by the sensor 150 for making the first switch 120 cancel the turning-off action within a setting time. This means that the second signal can be transmitted to the controller 140, and the controller 140 can turn on the first switch 120 continuously.

Further, when the reminding message is generated by the reminding unit 170 and the current power value is not greater than the predetermined proportion of the average power value, the controller 140 will turn, off the first switch 120. When the reminding message is generated by the reminding unit 170 and the current power value is greater than the predetermined proportion of the average power value, the resetting unit 160 will send the resetting signal to the controller 140, for example. When the controller 140 receives the resetting signal, the controller 140 will turn on the first switch 120 continuously, and average multiple power values within the predetermined time for reacquiring another average power value.

In a preferred embodiment, the power outlet device 100 further includes a timer (not shown). Thus, the first switch 120 can be turned off when arrives the setting time by the use of timer. Especially, when the sensor 150 does not sense the second signal or any wireless signal within the setting time, users may have no need to use these loads. For example, users may leave the operating environment or sleep. Thus, the present embodiment can send the reminding message through the reminding unit 170 by the use of the timer. Further, the first switch 120 can be turned, off for stopping power supplying to the first socket assembly 110, and the efficiency of energy saving can be achieved in the present invention.

Certainly, when users have need to use these loads, the sensor 150 of the present embodiment can receives the second, signal for making the first switch 120 cancel the turning-off action. In other words, when the sensor 150 receives the second signal, the controller 140 will turn on the first switch 120 continuously. Thus, the detecting circuit 130 can detects the power value of the first socket assembly 110 (current power value) continuously. The second signal also can be an infrared signal or other appropriate wireless signal sent by the corresponding remote controller of the load coupled to the first socket assembly. Certainly, the second signal also can be sent by a corresponding remote controller of an external load (not shown) without coupling to the first socket assembly, and the present invention will not be limited to this.

In one preferred embodiment, when the current power value of the first socket assembly 110 is not greater than the predetermined proportion of the average power value, the power outlet device 100 just sends the reminding message through the reminding unit 170 directly. And then, the turning-off action of the first switch 120 can be cancelled when the second signal is received within the setting time. Relatively, when the reminding message is sent by the reminding unit 170 and the second signal is not received by the sensor 150 within the setting time, the controller 140 still can turn off the first switch 120.

To sum up, the present invention can determine the working state of the first socket assembly by comparing the current power value and the average power value. Further, when at least one load coupled to the first socket assembly stops working (the load is turned off or in standby state), the power supply of the first socket assembly can be stopped for achieving the efficiency of energy saving. Certainly, when all of the loads coupled to the first socket assembly are in the working mode, the first socket assembly still can be power supplied continuously for keeping the operation of loads.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power outlet device, comprising:
   a first socket assembly coupled to an external power, having at least one first socket, wherein at least one load is coupled to the first socket assembly;
   a first switch, coupled to the first socket assembly for turning on or off power supply of the external power to the first socket assembly;
   a detecting circuit coupled to the first socket assembly through the first switch, detecting at least one power value of the first socket assembly when the first switch is turned on; and
   a controller coupled to the first switch and the detecting circuit respectively, averaging the power values within a predetermined time for generating an average power value;
   wherein, the controller turns on or turns off the first switch according to the average power value and a current power value;
   wherein, when the current power value is greater than a predetermined proportion of the average power value, the controller turns on the first switch continuously, and when the current power value is not greater than the predetermined proportion of the average power value, the controller turns off the first switch.

2. The power outlet device of claim 1, further comprising a sensor, a first signal and a second signal are received by the sensor for transmitting to the controller, wherein when the sensor receives the first signal, the controller turns on the first switch, when the sensor receives the second signal, the controller turns on the first switch continuously.

3. The power outlet device of claim 2, wherein at least one of the first signal and the second signal is sent by a corresponding remote controller of the load or an external load without coupling to the first socket assembly.

4. The power outlet device of claim 2, further comprising a resetting unit and a reminding unit, the resetting unit sends a resetting signal to the controller, the controller turns on the first switch continuously when receives the resetting signal, and makes the detecting circuit detect the power value of the first socket assembly for averaging the power values within the predetermined time to get the average power value again, and the reminding unit receives a reminding signal sent by the controller for generating a reminding message when the current power value is smaller than a reducing proportion of the average power value, the reducing proportion is 20%~50%.

5. The power outlet device of claim 4, wherein when the reminding message is generated by the reminding unit and the current power value is not greater than the predetermined proportion of the average power value, the controller turns off the first switch, when the reminding message is generated by the reminding unit and the current power value is greater than the predetermined proportion of the average power value, the resetting unit sends the resetting signal to the controller, when the controller receives the resetting signal, the controller turns on the first switch continuously and averages the power values within the predetermined time for obtaining the average power value again.

6. The power outlet device of claim 4, wherein the sensor, the resetting unit and the reminding unit are coupled to the controller in wired or wireless way.

7. The power outlet device of claim 1, further comprising a second socket assembly, the second socket assembly has at least one second socket, wherein the detecting circuit is coupled between the second socket assembly and the first switch.

8. The power outlet device of claim 7, further comprising a second switch, coupled to the external power, wherein the second socket assembly and the detecting circuit are coupled to the second switch, and the controller and the detecting circuit are coupled to the second switch, a third signal is suitable for transmitting to the controller when the second switch is turned on, and the controller turns on the first switch according to the third signal.

9. The power outlet device of claim 1, wherein the predetermined proportion is 50%~80%, the current power value is the latest power value detected by the detecting circuit, and the power values within the predetermined time are changed with the continuous detection of the detecting circuit.

10. A controlling method of a power outlet device, comprising:
    providing a power outlet device, the power outlet device includes a first socket assembly, a first switch, a detecting circuit and a controller, wherein the first socket assembly is coupled to an external power and has at least one first socket, at least one load is coupled to the first socket assembly, the first switch is coupled to the first socket assembly for turning on or off power supply of the external power to the first socket assembly, the detecting circuit is coupled to the first socket assembly through the first switch, the controller is coupled to the first switch and the detecting circuit respectively;
    the detecting circuit detects at least one power value of the first socket assembly when the first switch is turned on;
    the controller averages the power values within a predetermined time for generating an average power value; and the controller turns on or turns off the first switch according to the average power value and a current power value;

wherein, when the current power value is greater than a predetermined proportion of the average power value, the controller turns on the first switch continuously, and when the current power value is not greater than the predetermined proportion of the average power value, the controller turns off the first switch.

11. The controlling method of claim 10, wherein the power outlet device further comprising a sensor, a first signal and a second signal are received by the sensor for transmitting to the controller, when the sensor receives the first signal, the controller turns on power supply of the external power to the first socket assembly according to the first signal, when the sensor receives the second signal, the controller turns on the first switch continuously.

12. The controlling method of claim 11, wherein at least one of the first signal and the second signal is sent by a corresponding remote controller of the load or an external load without coupling to the first socket assembly.

13. The controlling method of claim 11, wherein the power outlet device further comprising a resetting unit and a reminding unit, the resetting unit sends a resetting signal to the controller, the controller turns on the first switch continuously when receives the resetting signal, and makes the detecting circuit detect the power value of the first socket assembly for averaging the power values within the predetermined time to get the average power value again, and the reminding unit receives a reminding signal sent by the controller for generating a reminding message when the current power value is smaller than a reducing proportion of the average power value, the reducing proportion is 20%~50%.

14. The controlling method of claim 13, wherein when the reminding message is generated by the reminding unit and the current power value is not greater than the predetermined proportion of the average power value, the controller turns off the first switch, when the reminding message is generated by the reminding unit and the current power value is greater than the predetermined proportion of the average power value, the resetting unit sends the resetting signal to the controller, when the controller receives the resetting signal, the controller turns on the first switch continuously and averages the power values within the predetermined time for obtaining the average power value again.

15. The controlling method of claim 13, wherein the sensor, the resetting unit and the reminding unit are coupled to the controller in wired or wireless way.

16. The controlling method of claim 10, wherein the power outlet device further includes a second socket assembly, the second socket assembly has at least one second socket, wherein the detecting circuit is coupled between the second socket assembly and the first switch.

17. The controlling method of claim 16, wherein the power outlet device further comprises a second switch, coupled to the external power, the second socket assembly and the detecting circuit are coupled to the second switch, and the controller and the detecting circuit are coupled to the second switch, a third signal is suitable for transmitting to the controller when the second switch is turned on, and the controller turns on the first switch according to the third signal.

18. The controlling method of claim 10, wherein the predetermined proportion is 50%~80%, the current power value is the latest power value detected by the detecting circuit, and the power values within the predetermined time are changed with the continuous detection of the detecting circuit.

* * * * *